United States Patent [19]

Shibata et al.

[11] Patent Number: 4,603,007

[45] Date of Patent: Jul. 29, 1986

[54] PASTE FOR FORMING A THICK CONDUCTIVE FILM

[75] Inventors: Koushiro Shibata, Tokyo; Tohru Miyoshi, Yamato; Isamu Hiraoka, Ashiya; Takeshi Shimomoto, Osaka, all of Japan

[73] Assignees: Sumitomo Metal Mining Company Limited, Tokyo; Shimomoto Giken Co., Ltd., Osaka, both of Japan

[21] Appl. No.: 754,215

[22] Filed: Jul. 12, 1985

[30] Foreign Application Priority Data

Jul. 13, 1984 [JP] Japan ................................. 145382

[51] Int. Cl.$^4$ ............................................. H01B 1/06
[52] U.S. Cl. .................................... 252/514; 252/518; 252/520; 106/1.14; 106/1.15
[58] Field of Search ...................... 252/518, 520, 514; 106/1.14, 1.15

[56] References Cited

U.S. PATENT DOCUMENTS

| | | | |
|---|---|---|---|
| 3,583,931 | 6/1971 | Bouchard | 252/518 |
| 4,225,469 | 9/1980 | Horowitz et al. | 252/518 |
| 4,312,770 | 1/1982 | Yu et al. | 252/514 |
| 4,318,830 | 3/1982 | Horowitz | 252/518 |
| 4,376,725 | 3/1983 | Prabhu | 501/19 |
| 4,439,352 | 3/1984 | Asada et al. | 252/518 |
| 4,532,075 | 7/1985 | Taylor | 252/518 |
| 4,539,223 | 9/1985 | Hormadaly | 252/518 |

Primary Examiner—Josephine L. Barr
Attorney, Agent, or Firm—Watson, Cole, Grindle & Wastson

[57] ABSTRACT

A paste for forming a thick electrically conductive film, which may, for example, be used to produce a touch panel for an electric appliance, contains 40 to 55% by weight of lead borosilicate glass powder containing 1 to 5% by weight of titanium oxide, a total of 15 to 35% by weight of ruthenium oxide powder and silver and/or palladium powder, 1 to 5% by weight of bismuth oxide powder and 1 to 5% by weight of alumina powder in an organic vehicle.

3 Claims, No Drawings

PASTE FOR FORMING A THICK CONDUCTIVE FILM

BACKGROUND OF THE INVENTION

1. Field of the Invention

This invention relates to a wear and acid resistant paste which is used for forming a thick electrically conductive film.

2. Description of the Prior Art

A household electric appliance usually has a number of control knobs which may be turned, pushed or pulled to switch on or off the power supply, turn up or down the volume or output, or otherwise control the operation of the appliance. The appliance has a plurality of openings through which shafts extend from the knobs to various parts in the appliance. These openings are likely to cause a serious problem particularly to a cooking utensil. It is impossible to prevent effectively the leakage of water, oil, etc. into the utensil through those openings which is very likely to result in its failure or erroneous operation.

The presence of those openings does not permit the washing of the appliance even if it becomes dirty. Therefore, a flat control panel requiring no such opening, and known as a touch panel has come to be used for an electric cooking utensil, too.

While various types of touch panels are known, the commonest type comprises a glass substrate, and electrodes and circuits formed on its surface from a transparent electrically conductive film of a material such as tin or indium oxide. This film has, however, the disadvantage of getting gradually worn if an acidic cleansing agent containing polishing sand is rubbed thereagainst. The touch panel on a cooking utensil is usually exposed to oil, soup, etc. scattering from a cooking pan. Therefore, there has been a strong desire for the development of a material which is used to form a conductive film defining a touch panel, and which withstands washing or cleansing.

SUMMARY OF THE INVENTION

The inventors of this invention were aware of the high wear resistance of a thick film formed from a ruthenium oxide ($RuO_2$) resistor and have studied the possibility of modifying it to a material for forming an electrically conductive film for a touch panel which is resistant to wear and acid.

It is, therefore, an object of this invention to provide a wear and acid resistant material for forming a thick electrically conductive film. The inventors have found that this object is attained by a material comprising glass containing $TiO_2$ instead of any conventional glass powder, $RuO_2$ powder and silver and/or palladium powder as electrically conductive components in a specific quantity relative to the glass powder, a small amount of bismuth oxide ($Bi_2O_3$) and a small amount of alumina ($Al_2O_3$).

According to this invention, there is provided an electrically conductive paste comprising 40 to 55% by weight of lead borosilicate glass powder containing 1 to 5% by weight of titanium oxide, a total of 15 to 35% by weight of ruthenium oxide powder and at least one of silver and palladium powders, 1 to 5% by weight of bismuth oxide powder and 1 to 5% by weight of alumina powder.

DETAILED DESCRIPTION OF THE INVENTION

An ordinary ruthenium oxide resistor paste for forming a thick film contains $RuO_2$ powder as an electrically conductive component, glass powder as a binder for bonding the conductive component to a substrate, and an organic vehicle in which those powders are dispersed. The paste may be applied to a ceramic substrate by screen printing and fired at a temperature of 750° C. to 900° C. to form a resistor film on the substrate. If the paste is applied to a glass substrate, however, it is necessary to fire it at a temperature not exceeding 700° C. The lowering in firing temperature gives rise to a great reduction in the wear resistance of the paste. Therefore, the inventors of this invention have conducted a lot of tests to obtain a glass powder composition which retains satisfactory wear resistance even if it is fired at a relatively low temperature, and found it suitable to use lead borosilicate glass containing $TiO_2$. While lead borosilicate ($PbO$-$B_2O_3$-$SiO_3$) glass is often used for preparing a thick-film paste, it is important according to this invention to add 1 to 5% by weight of $TiO_2$ thereto. Although the use of as large a quantity of $TiO_2$ as possible is effective from the standpoint of wear resistance, it is important to use 1 to 5% by weight of $TiO_2$, since its addition over 5% by weight hinders vitrification.

It is necessary that the resistance of a material for forming a conductive film be kept below a certain level. The conventional $RuO_2$ resistor paste, however, contains too high a proportion of glass as compared with its conductive component, and has, therefore, too high a resistance to be useful as a material for forming a conductive film. In order to lower its resistance, it is effective to add silver and/or palladium powder and lower the proportion of glass relative to the total quantity of the conductive components. The lowered proportion of glass, however, gives rise to a reduction in wear resistance, acid resistance and surface smoothness. This problem can, however, be overcome to some extent by the addition of $Bi_2O_3$ and $Al_2O_3$. It is suitable to employ 1 to 5% by weight of $Bi_2O_3$ which provides a surface of improved smoothness. The use of over 5% by weight of $Bi_2O_3$ should be avoided, as it is likely to have an adverse effect on surface smoothness. It is suitable to employ 1 to 5% by weight of $Al_2O_3$ which is effective for improving acid resistance. The use of over 5% by weight of $Al_2O_3$ should be avoided, as it is likely to impair the smoothness of the surface of the film formed by firing and lower the strength of its adhesion to the substrate.

Although the addition of $Bi_2O_3$ and $Al_2O_3$ improves the surface smoothness and acid resistance, respectively, of the film, it is impossible to lower the proportion of glass too much, since the proportion of glass relative to the conductive components has the most important bearing on the wear resistance of the film. According to this invention, therefore, it is essential that the paste contain a total of 15 to 35% by weight of the conductive components and 40 to 55% by weight of glass powder so that they may make a total of 70 to 75% by weight. The presence of over 55% by weight of glass powder results in too high a resistance to be suitable for a material for forming an electrically conductive film. The use of less than 40% by weight of glass powder results in the failure to obtain any satisfactory wear or acid resistance, or surface smoothness, even if $Bi_2O_3$ and $Al_2O_3$ may be added. It is also important to ensure that the paste contain a total of 70 to 75% by weight of the conductive components and glass powder, since too large or small proportion of the organic vehicle in the paste makes it impossible to obtain satisfactory screen printability. Moreover, it is appropriate to ensure that the conductive components consist of substantially the same proportions by weight of the ruthenium oxide powder and the silver and/or palladium powder.

The powders of the conductive components, lead borosilicate glass containing $TiO_2$, $Bi_2O_3$ and $Al_2O_3$ are kneaded with an organic vehicle to prepare the conductive paste of this invention. It is possible to use any organic vehicle of the type usually employed for preparing a thick-film paste, for example, a butylcarbitol acetate, or terpineol solution containing 10 to 20% by weight of ethyl cellulose.

The paste of this invention forms an electrically conductive film of satisfactorily high wera and acid resistances if it is fired at a temperature of, say, 550° to 700° C., and thereby enables the production of a highly reliable touch panel.

The invention will now be described more specifically with reference to a number of examples thereof.

acid having a temperature of 25° C. for five minutes, and after it had been washed with water and dried, its surface was examined by a microstereoscope. The results are shown in TABLE 2. Each double circle in TABLE 2 indicates that no change was found on the surface, and the single circle indicates that there was no corrosion of the film by the acid, though the change in color of the surface was apparently the result of some chemical change.

TABLE 2 also shows the conditions of the surface of each sample which had been noted before it was tested for wear and acid resistance. All of the sample films had a smooth and uneven surface, as indicated by a single circle in TABLE 2.

TABLE 1

| Glass | Composition (wt. %) | | | |
|---|---|---|---|---|
|  | PbO | $SiO_2$ | $B_2O_3$ | $TiO_2$ |
| A | 53.0 | 42.0 | 5.0 | 0.0 |
| B | 52.5 | 41.5 | 5.0 | 1.0 |
| C | 51.5 | 40.6 | 4.9 | 3.0 |
| D | 50.3 | 40.0 | 4.7 | 5.0 |

TABLE 2

| Sample No. | Paste Composition (wt. %) | | | | | | Test Results | | | |
|---|---|---|---|---|---|---|---|---|---|---|
|  | Ag | $RuO_2$ | Glass | $Bi_2O_3$ | $Al_2O_3$ | Vehicle* | Electric resistance (kΩ) | Wear resistance | Acid resistance | Surface prior to tests |
| 1 | 10.5 | 10.5 | A: 50 | 1 | 1 | 27 | 3.55 | x | o | o |
| 2 | 10.5 | 10.5 | B: 50 | 1 | 1 | 27 | 4.25 | o |  | o |
| 3 | 10.5 | 10.5 | C: 50 | 1 | 1 | 27 | 6.75 |  |  | o |
| 4 | 10.5 | 10.5 | D: 50 | 1 | 1 | 27 | 7.95 |  |  | o |

*Vehicle: A terpineol solution containing 12% by weight of ethyl cellulose.

EXAMPLE 1

Four types of lead borosilicate glass of different compositions containing different quantities of $TiO_2$ up to 5.0% by weight, except glass A, were prepared as shown in TABLE 1. They were pulverized and the resulting powders having a grain size not exceeding 325 mesh were mixed with the other components to prepare four different pastes of the same composition as shown in TABLE 2. Each of the pastes was applied by screen printing to an area having a width of 2 mm and a length of 24 mm on a standard glass substrate, and after it had been dried, it was fired at a temperature of 600° C. The resistance of the film formed by firing was measured across both ends thereof. Its surface was examined, and it was tested for wear and acid resistance, as will hereunder be described.

(1) Wear Resistance

A slider comprising a weight of 6.614 kg covered by cloth was rubbed against the surface of each film reciprocally 2000 times at a rate of 10 times per minute, while an acidic cleansing solution having a concentration of 10 g per 100 ml was being dropped onto the film at a rate of 5 ml per minute. The electric resistance of the film was, then, measured and compared with its initial resistance. The results are shown in TABLE 2. Each double circle indicates that the resistance of the film as tested was less than four times higher than its initial resistance, the single circle indicates that it was four to eight times higher than the initial resistance, and the "x" indicates that it was over eight times higher than the initial resistance.

(2) Acid Resistance

Each glass substrate having a film formed thereon was dipped in a 3.5% aqueous solution of hydrochloric As is obvious from TABLE 2, the $TiO_2$ in the glass contributes to improving the wear resistance of the film and it becomes higher with an increase in the amount of $TiO_2$ which the glass contains.

EXAMPLE 2

A plurality of sample pastes of different compositions as shown in TABLE 3 were prepared by using glass C in TABLE 1. The procedures of EXAMPLE 1 were repeated for testing each sample for wear and acid resistance. The test results are shown in TABLE 3. All the symbols indicating the results of the wear resistance tests, the single and double circles indicating the results of the acid resistance tests, and the single circle indicating the initial surface condition of the film have the same meanings as those hereinbefore explained with reference to TABLE 2. Each "x" in TABLE 3 indicates that the film was clearly corroded by the acid (acid resistance tests), or that the film already had a rough, cracked or otherwise defective surface when it was tested, as the case may be.

TABLE 3 teaches that if a paste contains too small a proportion of glass as compared with its conductive components, it produces a film which is unacceptably low in wear and acid resistance (e.g. Sample No. 5), while a paste containing too large a proportion of glass produces a film which is too high in electric resistance, though quite satisfactory in wear and acid resistance (Sample No. 16). It also teaches that $Bi_2O_3$ improves the smoothness of the film surface (Samples Nos. 7 and 8), but that the addition of too much $Bi_2O_3$ fails to provide a smooth surface (Sample No. 9). It is also noted from TABLE 3 that $Al_2O_3$ improves the acid resistance of the film (Samples Nos. 10 and 11), though the use of too much alumina results in a rough or uneven film surface (Sample No. 12).

In TABLE 3, Samples Nos. 10, 11, 13 to 15, 17 and 18 are illustrative of this invention, while Samples Nos. 5 to 9, 12 and 16 are shown for comparison purposes.

a total of 15 to 35% by weight of ruthenium oxide powder and at least one powder selected from the group consisting of silver and palladium powders;
1 to 5% by weight of bismuth oxide powder; and
1 to 5% by weight of alumina powder.

TABLE 3

| Sample No. | Paste Composition (wt. %) | | | | | | | Test Results | | | |
|---|---|---|---|---|---|---|---|---|---|---|---|
| | $RuO_2$ | Ag | Pd | Glass | $Bi_2O_3$ | $Al_2O_3$ | Vehicle | Electric resistance (kΩ) | Wear resistance | Acid resistance | Surface |
| 5 | 22.5 | 22.5 | — | 30 | 1 | 1 | 23 | 2.21 | x | x | x |
| 6 | 17.5 | 17.5 | — | 40 | 0 | 0 | 25 | 2.35 | x | x | x |
| 7 | " | " | — | " | 1 | 0 | 24 | 2.81 | x | x | o |
| 8 | " | " | — | " | 5 | 0 | 20 | 6.53 | x | x | o |
| 9 | " | " | — | " | 10 | 0 | 15 | 8.32 | o | x | x |
| 10 | " | " | — | " | 1 | 1 | 23 | 3.28 | o | o | o |
| 11 | " | " | — | " | 1 | 5 | 19 | 5.29 | o | o | o |
| 12 | 16.5 | 16.5 | — | 37 | 1 | 10 | 19 | 10.31 | o | | x |
| 13 | 10.5 | 10.5 | — | 50 | 1 | 1 | 27 | 5.45 | | | o |
| 14 | " | " | — | " | 1 | 5 | 23 | 8.79 | | | o |
| 15 | 7.5 | 7.5 | — | 55 | 1 | 1 | 28 | 12.45 | | | o |
| 16 | " | " | — | 58 | 1 | 1 | 25 | 30.75 | | | o |
| 17 | 17.5 | 12 | 5.5 | 40 | 1 | 1 | 23 | 4.20 | o | o | o |
| 18 | 10.5 | 8.5 | 2 | 50 | 1 | 1 | 27 | 5.80 | | | o |

What is claimed is:

1. A paste for forming a thick electrically conductive film, comprising:
   40 to 55% by weight of lead borosilicate glass powder containing 1 to 5% by weight of titanium oxide;

2. A paste as set forth in claim 1, wherein said glass powder, said ruthenium oxide powder and said at least one powder constitute a total of 70 to 75% by weight.

3. A paste as set forth in claim 1 or 2, wherein said ruthenium oxide powder and said at least one powder have an approximate ratio by weight of 1:1.

* * * * *